United States Patent [19]

Zimmerman

[11] 4,283,283

[45] Aug. 11, 1981

[54] WATER FILTER

[75] Inventor: George M. Zimmerman, San Gabriel, Calif.

[73] Assignee: Bon Aqua, Temecula, Calif.

[21] Appl. No.: 132,318

[22] Filed: Mar. 20, 1980

[51] Int. Cl.³ ............................................. B01D 27/02
[52] U.S. Cl. .................................... 210/282; 210/455
[58] Field of Search ............... 210/282, 287, 289, 291, 210/446–449, 451, 452, 455, 473, 474, 477, 478–481, 484, 497 R, 497.01

[56] References Cited

U.S. PATENT DOCUMENTS

| 2,562,735 | 7/1951 | Pick | 210/282 |
|---|---|---|---|
| 2,630,227 | 3/1953 | Rodwell | 210/282 |
| 3,630,683 | 12/1971 | Robb | 210/282 |
| 3,785,497 | 1/1974 | Giffard | 210/282 |
| 4,001,120 | 1/1977 | Gelman et al. | 210/449 |

Primary Examiner—Ivars C. Cintins
Attorney, Agent, or Firm—William P. Green

[57] ABSTRACT

A water filter including a cup into which water may be filled, and a replaceable filter cartridge removably receivable within the lower portion of the cup, with the cartridge including a hollow body having top and bottom openings across which first and second sheets of filter material extend, and with a mass of activated carbon being contained within a chamber in the body of the replaceable cartridge and confined between the two sheets of filter material.

9 Claims, 4 Drawing Figures

WATER FILTER

BACKGROUND OF THE INVENTION

This invention relates to improved water filters for removing from drinking water certain substances having unwanted taste and odor characteristics.

There are on the market water filters of a type including a cup into which water to be filtered is filled, and having a mass of activated carbon contained in a lower portion of the cup and through which the water flows before reaching an outlet in the bottom of the cup. In some such prior devices, the activated carbon has been confined between upper and lower sheets of filter material, so that the water first flows through the upper of these sheets for an initial filtering action, then flows through the activated carbon to attain removal of substances affected by such carbon, and finally flows through the lower filter sheet to the outlet of the device. After discharge from the filter unit, the water may be collected in a drinking glass or the like, or in a water bottle or other receptacle for later use. Such filters are not intended to purify the water, but rather to render it more palatable.

SUMMARY OF THE INVENTION

The present invention provides an improved water filter of the above discussed general type, and particularly one in which the active filtering elements are easily replaceable after a period of use, and after their filtering effectiveness has diminished by accumulation of separated substances on the filter sheets and activated carbon, to thereby enable reinstatement of the overall filter to its original effectiveness without the necessity for replacement of the main structure of the device. To attain this result, a unit embodying the invention includes a filter cartridge which is contained within the lower portion of the main filter cup and is removable therefrom, and which includes the filter sheets and the activated carbon therebetween. The cartridge may be lightly frictionally held in place in the bottom of the cup to give the assembly an integrated characteristic in use, while still permitting the filter cartridge to be easily removed from the cup for replacement when desired.

The replaceable cartridge includes a hollow body receivable within the lower portion of the main filter cup, and having an upper opening through which the water to be filtered enters the cartridge body and a lower opening through which the filtered water leaves the cartridge body, with a chamber being provided between the upper and lower openings for receiving the activated carbon filtering material in confined relation. The upper and lower sheets of filter paper or other filtering material extend across the top and bottom openings respectively of the filter body, and are peripherally secured thereto, desirably by forming the hollow body of resinous plastic material and fusion bonding it to the peripheries of the two filter sheets, preferably by ultrasonic bonding. To achieve the discussed light frictional retention of the cartridge in the lower portion of the cup, the cartridge body may have a side wall receivable within and engageable with a side wall of the cup, and having an outer surface which is very slightly oversize with respect to the inner surface of the cup wall to be a slightly forced fit therein, thereby frictionally retaining the cartridge in place in the cup while permitting it to be forced therefrom when desired. These side walls of the cartridge body and lower portion of the cup may extend vertically, preferably both being cylindrical.

At its upper end, the cartridge body may have a peripheral flange extending horizontally outwardly therefrom for engaging a support surface in the cup, and to which flange the upper filter sheet may be secured. At the lower end of the vertical cylindrical side wall of the cartridge body, that body may have an inwardly extending generally horizontal bottom wall containing the bottom opening across which the lower sheet of filter material extends.

BRIEF DESCRIPTION OF THE DRAWING

The above and other features and objects of the invention will be better understood from the following detailed description of the typical embodiment illustrated in the accompanying drawing, in which.

DESCRIPTION OF THE PREFERRED EMBODIMENT

Figure 1:
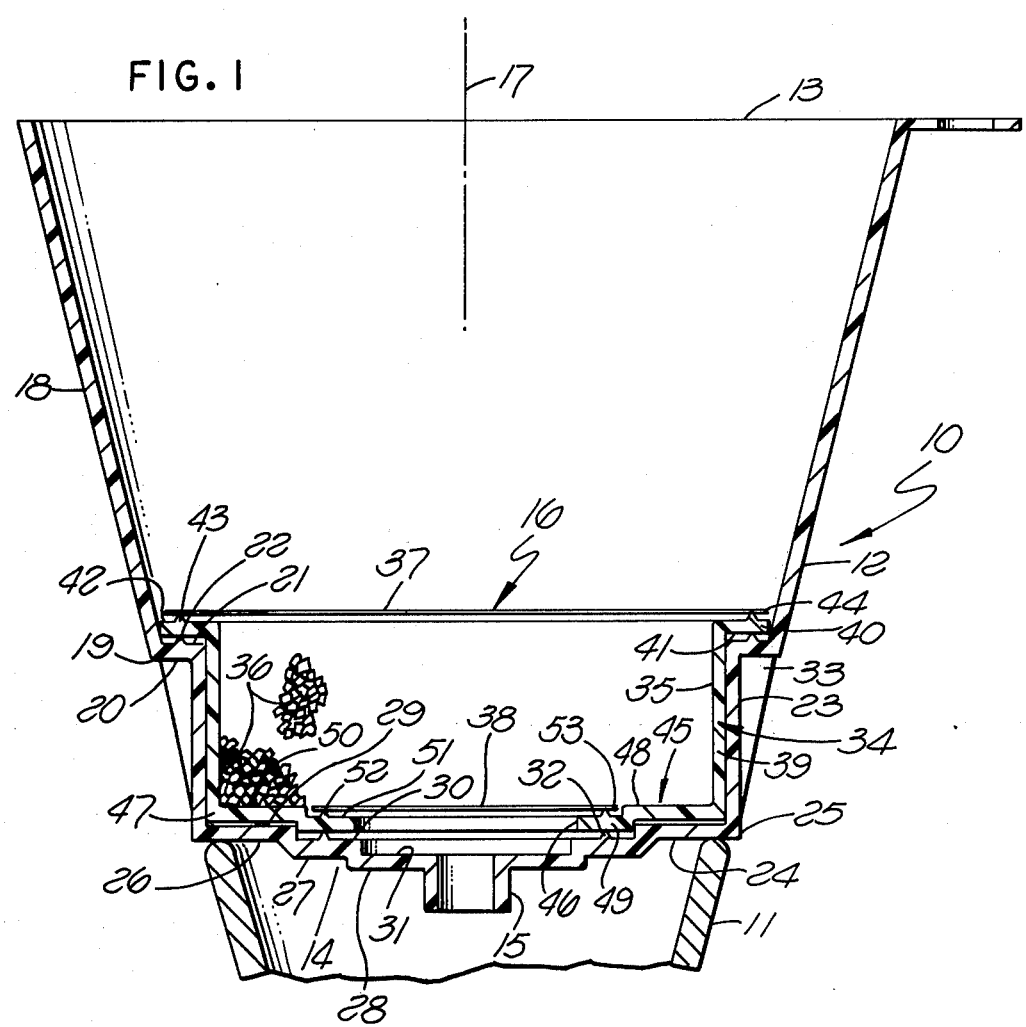
FIG. 1 is a central vertical section through a filter device constructed in accordance with the invention.

FIG. 1 illustrates at 10 a water filter constructed in accordance with the invention and which is typically to be utilized for filling filtered water into a drinking cup represented at 11, or any other receptacle for containing filtered water. The device 10 includes a main filter cup 12 having an open top 13 through which the water to be filtered is poured into the cup, and having a bottom wall 14 containing a central outlet opening or spout 15 through which the filtered water is discharged into cup 11. The filtering action is attained by a replaceable filter cartridge 16 removably contained within the lower portion of cup 12.

The cup 12 is constructed the same as that of a prior filter device in which the filtering materials are retained permanently in the lower portion of the cup rather than in a replaceable cartridge. To describe the cup in greater detail, the cup is preferably formed of an appropriate slightly resiliently deformable resinous plastic material, such as polyethylene, and may be circular in horizontal section and about a vertical axis 17, with the upper portion of the cup forming a frusto-conically flaring side wall 18 which progressively increases in horizontal dimension between the location 19 of FIG. 1 and the upper circular top edge or opening 13. At the location 19, the side wall of the cup extends inwardly to form a horizontal annular portion 20 forming an upwardly facing horizontal shoulder or surface 21 which preferably has, at a location midway between its radial inner and outer extremities, circular upwardly projecting rib or ring of material 22 for engaging the cartridge 16 in supporting relation. This rib 22, when viewed in vertical section in a plane containing axis 17, may have the upwardly rounded configuration illustrated in FIG. 1.

Extending downwardly from the inner edge of horizontal portion 20 of the outer cup 12, the side wall of that cup has a vertical cylindrical portion 23, centered about axis 17, and terminating downwardly at an inturned bottom wall 24 of the cup. This bottom wall is annular about axis 17, and, in extending radially inwardly from its peripheral edge 25 forms first an annular horizontal portion 26 of the bottom wall, is then stepped downwardly to form a second annular portion 27 at a slightly lower level, and at the inner edge of that portion is stepped downwardly again to form a third and radially innermost horizontal annular portion 28 at a still lower level. The discharge spout 15 is formed at the center of this inner lower portion of the bottom wall 24. The upper surfaces 29, 30 and 31 of the portions 26, 27 and 28 are stepped downwardly as illustrated, and are all desirably directly horizontal except for the provision on the intermediate surface 30, at a location midway between its radially inner and outer extremities, of a circular rib 32 which is centered about axis 17 and projects upwardly above the level of the remainder of the horizontal surface 30 to engage cartridge 16 in supporting relation. This rib 32 as viewed in vertical section may be rounded in the same manner as discussed in connected with rib 22. The strength of the lower portion of the cup may be improved somewhat by provision of a series of circularly spaced radial ribs 33 at the outer side of vertical side wall 23 as shown.

The replaceable filter cartridge 16 includes a hollow outer body or case 34 which is annular about the vertical axis 17 of the device and may be formed of an appropriate resinous plastic material, such as polyethylene. The body forms within its interior a cylindrical chamber 35 within which a mass of activated carbon filtering pellets 36 is contained, typically of a size to pass a 12×40 U.S. screen, with these pellets being confined between and contained by an upper sheet 37 of filtering material and a lower sheet 38 of such material. The body 34 has a vertical cylindrical side wall 39 centered about axis 17, and an upper horizontal annular flange 40 projecting radially outwardly from the upper end of side wall 39. This flange 40 has a horizontal undersurface 41 engageable with rib 22 of the cup in supported relation when the cartridge is inserted in the cup. The upper surface 42 of flange 40 is horizontal, except at the location of an upwardly projecting annular rib 43 centered about axis 17 by which the periphery of top filter sheet 37 is annularly bonded to flange 40. This rib 43 may initially be molded to a configuration similar to ribs 22 and 32 of cup 12, but may be fused under pressure and while in contact with sheet 37 to form a seal therebetween. This fusion may be attained by ultrasonic bonding of sheet 37 to rib 43. The sheet 37 may be externally circular, having a peripheral edge 44 of a diameter corresponding approximately to the external diameter of flange 40. The filter sheets 37 and 38 may be any known type of filtering paper or paper-like sheet material capable of removing particulate matter from the water being filtered, and capable of effectively retaining the activated carbon 36 within chamber 35.

The outer surface of cylindrical side wall 39 of the cartridge body is preferably of a diameter slightly greater than the diameter of the inner surface of side wall 23 of cup 12, the difference in diameters typically being between about one and three thousands of an inch, so that the cartridge body 34 must be forced slightly downwardly into the FIG. 1 position of reception within the lower portion of the cup, with slight resilient deformation of the two side walls 39 and 23 to permit such entry, and with resultant frictional retention of the cartridge in the lower portion of the cup and in fixed relation thereto. The filter cartridge is then permanently retained in that assembled position for handling with the cup without unintentional disassembly, and with an effective seal being provided by virtue of the tight fit between the parts, until the filter cartridge is subsequently forced upwardly out of its position of reception in the cup for replacement.

At the lower extremity of the vertical cylindrical side wall 39 of the cartridge body 34, the material of that body forms an inwardly extending bottom wall 45 of the cartridge body, which is annular about axis 17 and contains a circular opening 46 centered about that axis and through which water discharges downwardly from the filter cartridge. Bottom wall 45, in extending radially inwardly from the lower edge 47 of side wall 39, forms first an annular horizontal portion 48 of the bottom wall, and then an annular radially inner portion 49 located at a level slightly beneath the level of outer portion 48. The upper surface 50 of portion 48 of bottom wall 45 is horizontal, and the upper surface 51 of inner portion 49 of the bottom wall is similarly horizontal but at a level beneath that of surface 50, with a circular upwardly projecting rib 52 being formed at the center of surface 51 for attachment to the periphery of bottom filter sheet 38. This bottom sheet 38 has an outer circular edge 53 of a diameter just slightly smaller than the diameter of the recess formed by the downward offset of bottom wall portion 49, and is annularly secured in sealed relation to rib 52 by fusing the material of the rib, desirably by ultrasonic welding techniques. Lower filter sheet 38 may be formed of the same kind of filtering material as has been discussed in connection with upper sheet 37.

In using the device illustrated in the drawing, the replaceable filter cartridge 16 is first inserted downwardly into cup 12 to the position illustrated in FIG. 1, being pressed downwardly as the cartridge enters the cavity formed within the cylindrical side wall 23 of the bottom portion of the cup. The forced fit relationship between the side of the cartridge and wall 23 frictionally retains the cartridge in position as previously discussed and until intentionally removed from the cup. To fill filtered water into a receptacle such as that shown at 11 in FIG. 1, the device 10 is placed over and in a position of support on the upper edge of that receptacle, and water is poured into the upper end of cup 12 to flow downwardly through the filter material 37 and activated carbon 36 and the bottom sheet 38 for discharge downwardly through outlet 15 to the receptacle 11. Particulate matter and substances having adverse taste and odor characteristics are removed by the filtering materials, including for example chlorine, unpalatable impurities, and the like, to give the filtered water a vastly improved taste and odor.

The proportioning of the bottom outlet 15 and the openings at the top and bottom of the filter cartridge, as well as the relative positioning of the bottom filter sheet 38 relative to outlet 15, are such as to slow the flow of water downwardly through the device just sufficiently to attain an effective filtering action, while at the same time maintaining a rapid enough flow to fill the cup 11 as quickly as possible. In this connection, it is considered of importance that the bottom filter sheet 38 is secured to the upper side of bottom wall 45 of the cartridge body, at a level slightly above the undersurface 49 of bottom wall 45 by which the cartridge is supported. This leaves a space of sufficient size beneath sheet 38 and above the upper surface 31 of the bottom wall of the cup to enable water to accumulate fairly rapidly for discharge downwardly through the outlet.

Figure 2:
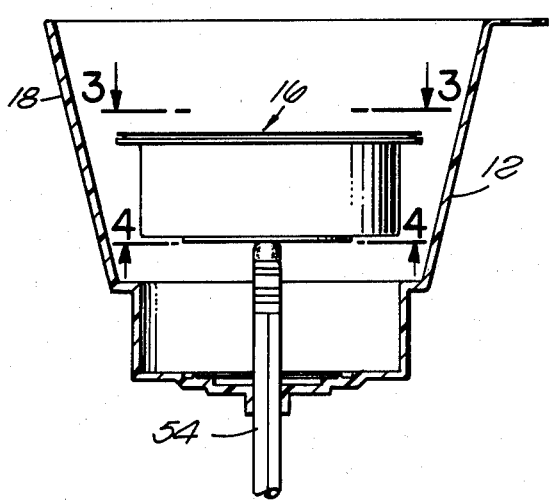
FIG. 2 is a view similar to FIG. 1, showing the manner in which the filter cartridge can be forced from the filter cup for replacement.
Figure 3:
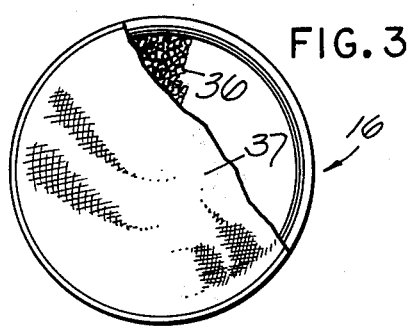
FIG. 3 is a top plan view of the filter cartridge, taken on line 3—of FIG. 2.
Figure 4:
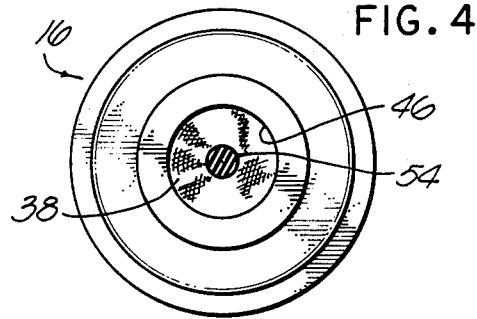
FIG. 4 is a bottom plan view of the filter cartridge, taken on line 4—4 of FIG. 2.

After the device has been in use for a substantial period of time, impurities may accumulate on filter sheets 37 and 38 and on the activated carbon 36, decreasing the effectiveness of these filtering elements. When that condition is noted, the user can remove the replaceable filter cartridge 16 and insert another such cartridge in the cup 12 to reinstate the entire unit to its original highly effective condition. FIG. 2 illustrates the manner in which the frictionally retained cartridge 16 can be removed, specifically by insertion upwardly through the tubular outlet spout 15 of an elongated removal instrument or tool 54, acting upwardly against the center of the bottom sheet 38 to force cartridge 16 upwardly relative to the cup and to the FIG. 2 position from which it can be withdrawn. An item which can very effectively be used as the removal element of FIG. 2 is a pencil having an eraser at its end, with the eraser being placed in engagement with the filter sheet 38 to act thereagainst without puncturing through the sheet.

While a certain specific embodiment of the present invention has been disclosed as typical, the invention is of course not limited to this particular form, but rather is applicable broadly to all such variations as fall within the scope of the appended claims.

I claim:

1. A water filter comprising:
    a cup having a top opening through which water may be filled into the cup, and having a bottom outlet through which filtered water discharges; and
    a replaceable filter cartridge removably received within a lower portion of said cup and through which the water flows to said outlet;
    said replaceable cartridge including a hollow body adapted to be removably placed in said lower portion of the cup and containing a chamber and a top opening through which water flows downwardly into the chamber and a bottom opening through which water discharges from the chamber toward said outlet;
    said replaceable cartridge including a first sheet of filter material extending across said top opening of the cartridge body and peripherally sealed to the body about said top opening, a second sheet of filter material extending across said bottom opening of the cartridge body and peripherally sealed to the body about said bottom opening, and a mass of activated carbon contained within said chamber between said first and second sheets of filter material and retained in the chamber by said sheets;
    said lower portion of the cup having a cylindrical vertically extending side wall, an annular bottom wall extending inwardly at the lower end of said side wall and containing said outlet at its center, and an annular essentially horizontal flange extending horizontally outwardly from and about the upper end of said side wall and connected peripherally to an upper portion of said cup;
    said body of the replaceable cartridge having a vertical cylindrical side wall extending about said chamber and having an outer surface of greater diameter than the internal diameter of said side wall of the lower portion of the cup to be forced fit therein frictionally retaining the cartridge in the cup while permitting it to be forced therefrom for replacement;
    said body of the cartridge having an annular bottom wall extending horizontally inwardly from the lower extremity of said side wall of the cartridge body and containing said bottom opening, said second sheet of filter material being received at the upper side of said bottom wall of the cartridge body and being peripherally fusion sealed thereto;
    said body of the cartridge having an annular horizontal flange extending outwardly from and about the upper extremity of said side wall of the cartridge body and fusion sealed to the periphery of said first sheet of filter material;
    said bottom opening of the cartridge body and said second sheet of filter material being smaller than said upper opening of the cartridge body and said first sheet of filter material, and being larger than said bottom outlet of the cup.

2. A water filter as recited in claim 1, in which said bottom wall of the cartridge body has an outer annular horizontal portion at a first level, and an inner annular horizontal portion at a lower level to the upper side of which said second sheet of filter material is secured and which projects downwardly into an annular recess formed in said bottom wall of the lower portion of the cup.

3. A water filter as recited in claim 2, in which said inner portion of said bottom wall of the lower portion of the cup has a circular upwardly projecting rib engageable with the body of the cartridge about said lower opening therein, said cup having an upwardly projecting circular rib engageable with the underside of said flange on the upper portion of the cartridge body.

4. A water filter comprising:
    a cup having a top opening through which water may be filled into the cup, and having a bottom outlet through which filtered water discharges; and
    a replaceable filter cartridge removably received within a lower portion of said cup and through which the water flows to said outlet;
    said lower portion of the cup having a side wall extending thereabout;
    said cup having a generally horizontal wall extending outwardly from and about an upper end of said side wall;
    said replaceable cartridge including a hollow body which is adapted to be removably placed in said lower portion of the cup and containing a chamber and which has a top opening through which water flows downwardly into the chamber and a bottom opening through which water discharges from the chamber toward said outlet;
    said replaceable cartridge including a first sheet of filter material extending across said top opening of the cartridge body and peripherally sealed to the body about said top opening, a second sheet of filter material extending across said bottom opening of the cartridge body and peripherally sealed to the body about said bottom opening, and a mass of activated carbon contained within said chamber between said first and second sheets of filter material and retained in the chamber by said sheets;
    said body of the cartridge having a side wall which is a close fit within said side wall of the lower portion of the cup in a relation preventing flow of water downwardly therebetween to require that water flowing to said outlet pass through said filter sheets and said activated carbon;

said body of the cartridge having a peripheral flange extending generally horizontally outwardly from the upper end of said side wall of the cartridge body and received above said generally horizontal wall of the cup;

said cup having an upper portion containing and defining an upper water receiving compartment above the top of said cartridge and above the top of said flange and having a side wall extending about said compartment and projecting upwardly higher than the flange from the periphery of said generally horizontal wall of the cup;

said upper compartment within the upper portion of the cup above said cartridge and said flange being larger in horizontal and vertical dimension and in volume than said lower portion of the cup which contains said cartridge.

5. A water filter as recited in claim 4, in which said side wall of said body of the replaceable cartridge has an outer surface which is a forced fit within said side wall of said lower portion of the cup to frictionally retain the cartridge in the cup while permitting it to be forced therefrom for replacement.

6. A water filter as recited in claim 4, in which said bottom outlet of the cup is located directly beneath a portion of said replaceable cartridge at a location enabling a removal instrument to be inserted upwardly through the bottom outlet into contact with the cartridge and to force the cartridge upwardly relative to the cup for removal therefrom.

7. A water filter as recited in claim 4, in which said first sheet of filter material is peripherally secured to said flange and is larger horizontally than said second sheet of filter material.

8. A water filter as recited in claim 4, in which said lower portion of the cup has a bottom wall containing said outlet, said cartridge body having a bottom wall containing said bottom opening and having an undersurface extending about and adjacent said bottom opening and which is engageable downwardly with said bottom wall of the lower portion of the cup, said second sheet of filtering material being peripherally secured to the upper side of said bottom wall of the cartridge body and being located at a level above that of said undersurface of the bottom wall of the cartridge body.

9. A water filter as recited in claim 4, in which said lower portion of the filter cup has upwardly facing shoulders at the upper and lower ends of said replaceable cartridge, and which have essentially annular upwardly projecting ribs for contacting and supporting the cartridge body at locations essentially about said upper and lower openings respectively.

* * * * *